United States Patent [19]

Schaldach

[11] Patent Number: 5,208,996
[45] Date of Patent: May 11, 1993

[54] AXIS REFERENCE PROBE

[76] Inventor: Kurt Schaldach, 20409 Whitebark Dr., Strongsville, Ohio 44136

[21] Appl. No.: 822,868

[22] Filed: Jan. 21, 1992

[51] Int. Cl.$^5$ ............................................. G01D 21/00
[52] U.S. Cl. ..................................... 33/644; 33/641; 33/555
[58] Field of Search ................. 33/502, 832, 833, 630, 33/638, 640, 641, 642, 631, 644, 544, 544.3, 542, 555, 556

[56] References Cited

U.S. PATENT DOCUMENTS

| | | | |
|---|---|---|---|
| 1,695,453 | 12/1928 | Carpenter | 33/542 |
| 1,879,398 | 9/1932 | Mirfield | 33/542 |
| 2,454,246 | 11/1948 | Worthen | 33/542 |
| 4,265,026 | 5/1981 | Meyer | 33/542 |
| 4,476,634 | 10/1984 | Yamamoto et al. | 33/542 |
| 4,509,267 | 4/1985 | Flaten | 33/644 |

OTHER PUBLICATIONS

XYZ Setter (TM) Lyndex Corp. Advertise., No Date.
Zero Setter (TM), Lyndex Corp. Ad., No Date.
PointFinder (TM), Lyndex Corp. Ad., No Date.

Primary Examiner—William A. Cuchlinski, Jr.
Assistant Examiner—William C. Dowling
Attorney, Agent, or Firm—Woodling, Krost & Rust

[57] ABSTRACT

An axis reference probe for locating reference surfaces and determining tool lengths. The axis reference probe is used in conjunction with a computer controlled machine. The axis reference probe has a body and a first bore extending longitudinally through said body. A plunger having a cam surface thereon, a spring, a spring retainer, and a plug reside generally in said first bore. A second bore is oriented transversely with respect to said first bore and communicates therewith, and, a gage residing primarily in said second bore. The gage has a cam following actuation arm which follows movement of said cam and translates longitudinal movement of said plunger into rotary indication on said gage. The spring retainer and plug are affixed to said body. The spring resides between the spring retainer and the plunger and resists movement of said plunger in the direction of the spring, said movement of said plunger being the result of an externally applied force, for example, the force exerted on the plunger when contacting a reference surface or tool.

8 Claims, 4 Drawing Sheets

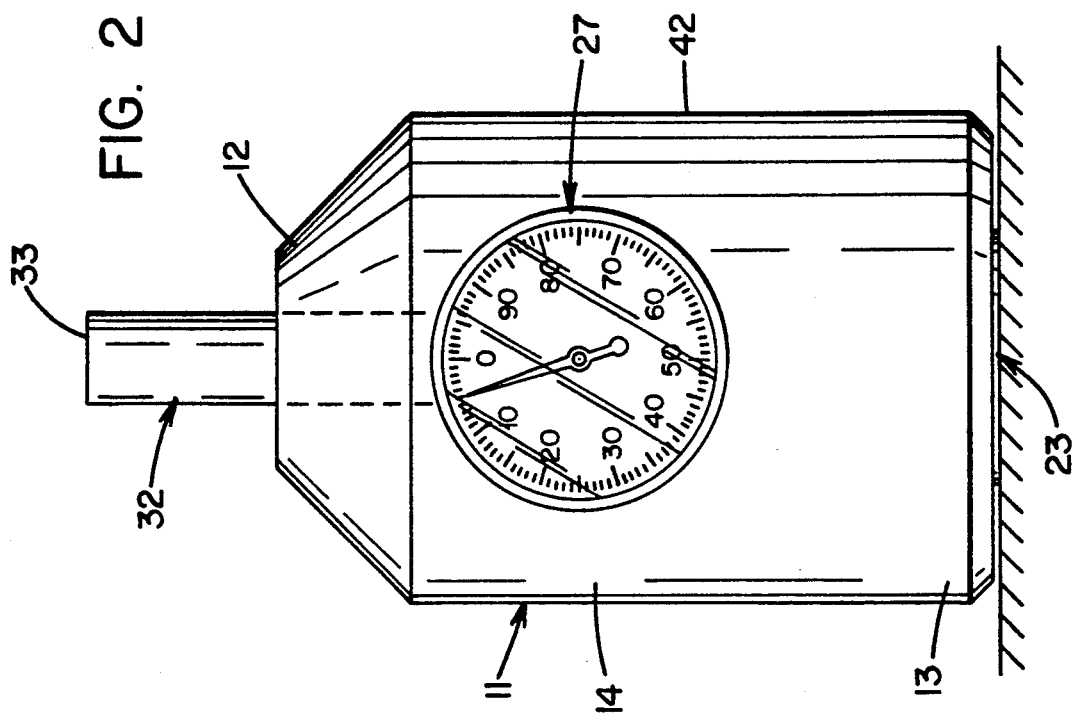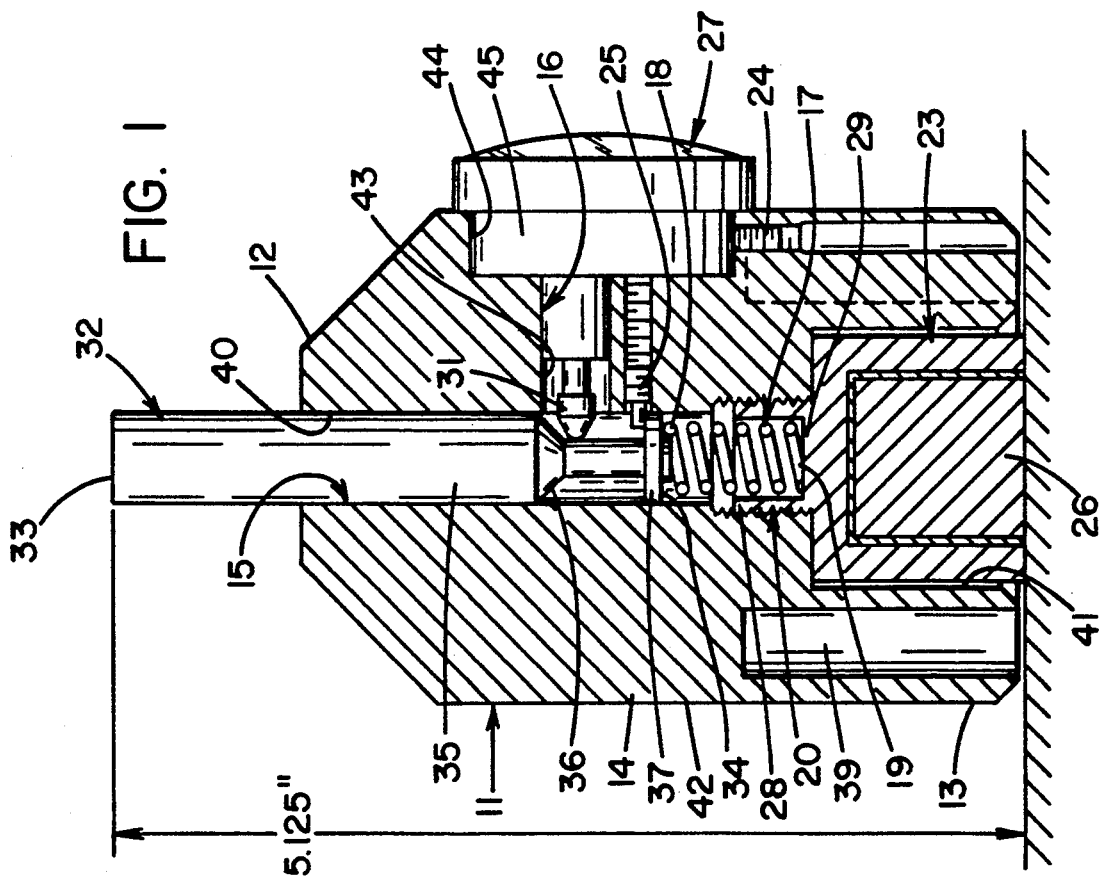

AXIS REFERENCE PROBE

FIELD OF THE INVENTION

This invention relates to an axis reference probe. The axis reference probe is used by an operator of a computer controlled machine tool. The axis reference probe is used in the initial setup of, and prior to, a machining operation.

BACKGROUND OF THE INVENTION

The axis reference probe is used to define a point in space called a reference point. The reference point is then used to determine machine tool length. The axis reference probe is also used in determining the distance from the machine home position to a work piece. The machine home position is defined as the starting point of the machine head.

The axis reference probe does not, in and of itself, determine the distance and length aforementioned. A computer that controls the machining process determines, with the aid of the axis reference probe, the machine tool length and the distance from machine home position to a work piece. The axis reference probe enables the quick and accurate determination of the machine tool length and the distance from machine home position to a work piece.

SUMMARY OF THE INVENTION

It is an object of this invention to provide and enable the quick, accurate, and repeatable setup of computer controlled machine tool operations. The quick, accurate, and repeatable setup of the machine tool operations is performed by using the axis reference probe in two modes. The first mode is the tool setting mode. The second mode is the work piece setting mode.

It is an object of this invention to provide for the quick, accurate, and repeatable setup of machine tool operations without damage to any of the machine tools that may be used. The axis reference probe of the present invention employs a plunger which, when in contact with a machine tool, is depressed against a spring. Presently the machine set up operations are performed by most in the machine tool industry without the aid of an axis reference probe. This is done by most in the industry through use of a reference surface such as a table top, vice, work piece, or other rigid surface. When using a reference surface such as a table top, its rigidity can cause a machine tool to break when the tool is brought into contact with it due to the delicate cutting tool materials.

It is an object of this invention to reduce the cost of a machine tool setup operation in that fewer or less machine tools will be broken. A more accurate measurement of the tools and work piece can be achieved in less time and the entire setup can be performed without regard to the work piece to be machined.

Other objects and a more complete understanding of the invention may be had by referring to the following description and drawings.

DESCRIPTION OF THE DRAWINGS

FIG. 1 is a side elevational, sectional view of the axis reference probe.

FIG. 2 is a front elevational view of the exterior of the axis reference probe.

DESCRIPTION OF THE PREFERRED EMBODIMENT

Figure 3:
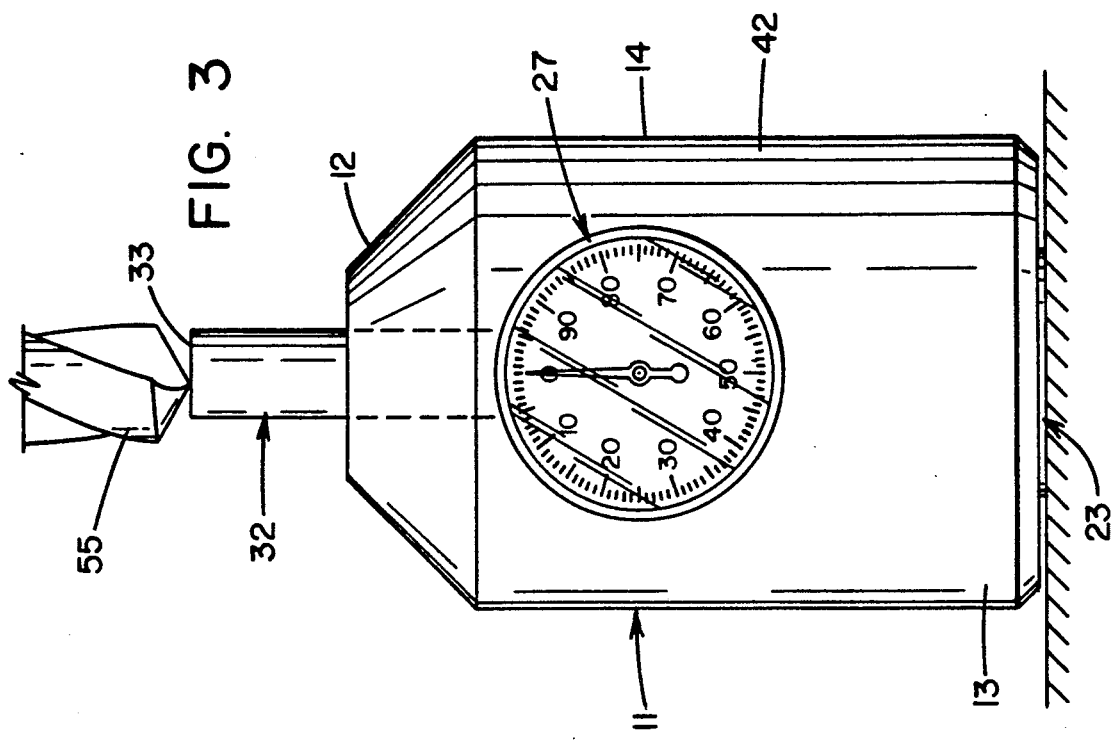
FIG. 3 is a front elevational sectional view of the axis reference probe during engagement of said axis reference probe with a machine tool.

The axis reference probe which is fully disclosed herein has several purposes. The primary purpose of the axis reference probe is to enable the quick, accurate, and repeatable setup of machine tool operations. The quick, accurate, and repeatable setup of machine tool operations is performed by using the axis reference probe in two modes. The first mode is the tool setting mode. The second mode is the work piece setting mode. The tool setting mode accomplishes a determination of the tool length. The tool length is then inserted, or inputted, into the computer's tool offset register or memory.

The work piece setting mode employs the axis reference probe to determine, along with the computer that is driving the machine tool, the distance from the machine tool to the work piece. Once this distance is determined, it is then inserted into the computer's work offset memory for use in a program which instructs the machine to perform machining operations on the work piece. The tool setting mode and the work piece setting mode will be described with specificity hereinbelow. Additionally, the specific operation and function of the axis reference probe will also be described hereinbelow.

The preferred embodiment of the axis reference probe has a body, a first bore that extends longitudinally through the body, and a second bore in the body which extends from the exterior of the body perpendicularly to the first bore. An indicating gage having a cam following actuation arm resides in the second bore. A plunger with a cam surface located thereon resides in the first bore. A plug having a spring retainer affixed to it resides in the first bore, and, a spring is interposed between the spring retainer and the plunger. Additionally, the preferred embodiment of the invention herein also has weight reduction bores in the body and two set screws. The first set screw is used to affix the gage to said body. The second set screw is used to restrain the plunger from exiting the body.

The invention described herein is unique because of its simplicity. Particularly, the invention is unique in that it provides a simple way of translating longitudinal movement of the plunger into rotary movement of an indicator on the gage. Longitudinal movement of the plunger is translated into rotary movement on the gage by virtue of the fact that the cam following actuation arm of the gage rides upon a cam surface on the plunger. The cam following actuation arm does not always reside on the cam surface on the plunger. Due to manufacturing tolerances of the plunger and/or magnet, the cam following actuation arm will sometimes reside on a portion of the plunger having a smaller diameter than other portions of the plunger. Longitudinal movement of the plunger is caused by an actuation force which will be described later. Movement of the cam following actuation arm does not take place during all longitudinal movement of the plunger. This is due to the plunger's manufacturing tolerances. Strict manufacturing tolerances of the plunger and/or magnet are not necessary for this invention to work as intended. This will be understood more fully when the invention is taken into consideration with respect to the drawings which are described with specificity hereinbelow.

Strict manufacturing tolerances of the plunger are not necessary as the plunger can and does move longitudinally a short distance without any indication taking place. As will be seen later, the plunger can move without any change of indication on the gage and without any detriment to the operation of the invention. The only essential indication is when the gage indicates zero as will be seen in the discussion hereinbelow.

An object as previously stated, is that a quick, accurate, and repeatable setup of the machine tool operation be facilitated by this invention. In order for this invention to facilitate a quick, accurate, and repeatable setup of a machine tool operation, the indicator on the gage must indicate zero at the time when the distance between the furthest extremity of the first end portion of the plunger and the furthest extremity of the second end portion of the plug is exactly five inches. The five inch length will be discussed in detail and will be defined hereinbelow.

A computer controlled machine tool operation requires knowledge of the machine's tool lengths and the distance from the machine head to the work piece. The tool length is determined by the computer controlling the machine tool in conjunction with the axis reference probe. The lengths and distances that are discussed in this application are determined by the computer (not shown) that controls the machine tool. Particularly, the computer has the ability to measure machine head travel in any one particular axis. For instance, the computer has the ability to determine how far the machine moves in the Z axis, the X axis, or the Y axis. It should be understood that this description does not restrict the invention to use in only the cartesian coordinate axis and, in fact, it is understood that this invention may be used in connection with any reference system such as spherical or otherwise. The Z axis of the cartesian coordinate system will be used for discussion herein. The Z axis as used in this specification is the axis that extends vertically with respect to the face of the earth. Put another way, the vertical axis as described herein, the Z axis, is the axis that is perpendicular to a line tangential to the earth's surface.

In the tool setting mode, the axis reference probe provides a reference point which is located exactly five inches from a table or other reference surface on which the axis reference probe is mounted. The five inch distance is determined, or calibrated, on the axis reference probe prior to its use.

As briefly set forth previously, the invention herein uses or employs a plunger. The plunger can and does move in two directions. The first direction is in a direction such that the plunger is depressed against the force of the spring, that is, toward the second end portion of the body. The second direction is the direction that the spring urges the plunger, that is, toward the first end portion of the body. When the plunger is depressed against the force of the spring, the plunger is moving longitudinally in the direction of the second end portion of the body.

Once sufficient longitudinal movement of the plunger has taken place, the cam following actuation arm then rides upon the cam surface of the plunger. There exists a point on the cam surface when the cam following actuation arm will have moved sufficiently so as to cause a zero indication on the face of the gage. It is necessary to understand there is a point on the cam surface that corresponds to an indication of zero on the gage.

However, it is important to note how the zero indication is obtained and its significance. The zero indication is obtained by calibrating a five inch distance between the first end portion of the plunger and the second end portion of the plug. It should be noted that the plug is fixed to a spring retainer which, in the preferred embodiment, has thread means keeping the plug and spring retainer combination in a permanent position with respect to the body. The plunger can move with respect to the body and its movement is resisted in the direction of the second end portion by a spring residing in the spring retainer. The plug can not move with respect to the body.

When the plunger moves sufficiently with respect to the body such that the first end portion of the plunger is five inches from the second end portion of the plug is determined by a calibration means such as a micrometer, the face of the gage and the indicator on the gage are adjusted so as to indicate exactly zero. Therefore, it can be seen that a zero indication on the gate means there are exactly five inches between the first end portion of the plunger and the second end portion of the plug.

It can be seen that when five inches is the distance between the first end portion of the plunger and the second end portion of the plug, there exists a point on the cam on the plunger upon which the cam following actuation arm resides causing the gage to indicate zero. After the axis reference probe has been calibrated to indicate zero on the gage face, it can be readily understood that once the external force causing the five inch distance between the first end portion of the plunger and the second end portion of the plug of the axis reference probe is removed, another distance therebetween will exist. In practice, this distance is approximately five and one eighth inches.

The five and one eighth inch distance previously described will cause an indication other than zero. However, the change in longitudinal movement of the plunger between five inches and five and one eighth inches, namely one eighth of an inch, does not relate linearly with respect to the change of the indication on the face of the gage. For instance, a plunger travel of one eighth of an inch is not indicated as a one eighth inch change on the indicator of the gage. The reason for the non-linearity is due to the manufacturing tolerances of the plunger previously discussed. Specifically, there is a dead space which can be defined as the distance that the plunger must first move, or be depressed, before there will be any change in transverse movement of the cam following actuation arm. Specifically, the cam following actuation arm will not be actuated until it actually resides upon the cam surface of the plunger. Linearity between the gage indication and plunger travel need not be established for this invention to function as intended. The ability of the gage to repeatedly indicate zero, once the five inch distance is calibrated as previously described, is known as its repeatability. The ability of the axis reference probe to repeatedly indicate zero is an important aspect of the invention. Repeatability and linearity are different concepts.

A description of the use of the axis reference probe in the tool setting mode follows. For the purposes of this discussion, the use of the axis reference probe will be described with respect to one axis only and that axis is the Z axis. First, the axis reference probe when used in the Z axis, is placed on a reference surface such as a table with the plunger oriented vertically. The axis reference probe will be oriented such that the plug will be on the surface of the table. As the axis reference probe sits in the static or unengaged position, the indication on the gage of the axis reference probe will be other than zero. The overall length of the axis reference probe, that is the length between the second end portion of the plug and the first end portion of the plunger, will be approximately five and one eighth inches long. It should be noted that five and one eighth inches is not a fixed distance, and depending upon manufacturing tolerances of the plunger, it can be a distance that can vary slightly from five and one eighth inches.

With the axis reference probe mounted longitudinally in the Z axis, a machine tool head or machine tool spindle will be oriented at some distance above the axis reference probe. When it is said that the machine head, tool or spindle is located "above" the axis reference probe, "above" is used in the sense that it be further from the center of the earth and lies in the Z axis. The position that the machine head assumes when fully retracted by the computer control system of the machine, is known as the machine home position.

The machine head is brought down the Z axis manually by the operator of the machine such that it engages the plunger of the axis reference probe. Upon engagement of the plunger by the machine head, the operator then adjusts the machine head slightly downward until he achieves a zero indication on the gage of the axis reference probe. In actual practice, the operator of the machine may cause the machine head to come down too far and will require the operator to adjust the machine head back up to achieve a zero indication on the gage of the axis reference point. With the machine head in a position such that the gage on the axis reference probe indicates zero, the operator then knows the machine head is exactly five inches away from the table surface.

When the machine head is located exactly five inches above the table surface as previously described (as indicated by a zero indication on the axis reference probe's gage) the operator then looks at a Cathode Ray Tube (CRT) display of the computer (not shown) which displays various parameters. In particular, the operator will view a numerical value on the CRT display that indicates the distance the machine head has travelled from the machine home position to the distance five inches above the surface of the table.

The point five inches above the reference surface is called the reference point. The CRT on the computer control system will indicate a certain numerical value in inches which is namely the distance from machine home position to five inches above the table surface. In this manner, the distance from machine home position to a reference point five inches above the surface upon which the axis probe resides has been determined. It should be readily understood that, although the preferred embodiment of this invention uses a five inch distance to obtain a zero indication and to establish a reference point, this could be done using other distances such as three, four, or six inches. A reference point five inches above the reference surface (table, etc.) is known as the Z origin.

The operator, after determining the distance between the Z origin (which is five inches above the surface the axis probe resides upon) and the machine home position, instructs or commands the machine to retreat back to the machine home position. A tool is then inserted into the machine head and the sequence previously described is repeated. With the machine tool inserted or mounted into the machine head, the machine tool is brought down until it engages the plunger on the axis reference probe. Once engaged, the operator adjusts the tool down to a point such that a zero indication is obtained on the gage of the axis reference probe. The operator then commands the machine to determine the difference in the lengths that the machine head has travelled. The computer has stored in its memory the distance between machine home position and the Z origin without the tool mounted in the machine head. Additionally, the computer has stored in its memory the distance between machine home position and the Z origin with the tool mounted in the machine head. The operator then instructs the computer to determine the difference in those two distances. The difference between those two distances is the tool length.

Typically, in a machining process more than one tool is used in a given axis. Therefore, this process is repeated with respect to all tools that will be used in machining in the Z axis. Presently, without the aid of an axis reference probe, the practice of operators has been to perform the setup in a less accurate fashion. Specifically, the machine head is brought down to the work piece surface as previously described and the operator is then able to obtain the distance between the machine home position and the work piece surface. A tool is then inserted as previously discussed and it is brought down to contact the work piece surface. The operator then determines the distance that the machine head has travelled with the tool mounted in the machine head. The operator then instructs the computer to determine the difference in those two distances. The present invention enables this calculation to be made in a much quicker, more accurate and reliable fashion. Additionally, the work piece need not be involved in obtaining tool lengths. Specifically, when the tool length is determined without the aid of the axis reference probe, tools are often damaged or destroyed. The operator is unable to quickly control how far the machine head drives the head with the tool inserted in it in a downward Z direction. This causes the tool to smash into or break off at the point of contact with the table or work piece surface. Typically, an operator, without the use of the axis reference probe, slides a piece of paper back and forth under the tool as it comes down. When the operator is no longer able to move the paper, he knows that the tool has progressed sufficiently so as to trap the paper in place. This method of determining the tool length is inaccurate as operators tend to bring the tool down too far and quite frequently the tool breaks when it impacts the table or work piece. Breaking is particularly common with ceramic tools. Additionally, inaccuracy is inherent in the paper method.

Accuracy and repeatability of the reference probe's gage has been discussed briefly above, however, a fuller explanation of accuracy and repeatability is now given. Accuracy is a measurement against a known standard. The ability of the gage to indicate, with exactness, zero when there are five inches between the first end portion of the plunger and the second end portion of the plug is defined as the accuracy of the gage. Accuracy can be stated in another way as how well the gage indicates the five inch distance.

Repeatability is the characteristic of reproducing the same indication successively use after use. Repeatability can be stated as how frequently the gage produces the same indication. In the present invention, the indication of the gage is not a measurement per se, with the exception of one point. That point is when the gage indicates zero, signifying, after calibration, that there are five inches between the furthest extremities of the first end portion of the plunger and the second end portion of the plug. The gage of the axis reference probe is accurate only at the zero indication point. The gage of the axis reference probe will also repeatedly indicate zero when external conditions so dictate, namely, when there are five inches between said extremities. As has been previously stated, the depression of the plunger with respect to the body does not produce a linear response on the gage.

The axis reference probe is now discussed in the work piece setting mode. Specifically, the axis reference probe is used to determine the work piece's location relative to the machine head. The machine head is lowered in the Z axis together with the axis reference probe mounted inversely (upside down) toward the work piece. The inverse mounting is facilitated by magnetic means in the plug to be discussed in detail hereinbelow. When the plunger of the axis reference probe contacts the work piece, the machine head continues slightly downward until the gage on the axis reference probe indicates zero. At this point, the travel of the machine head plus five inches is the distance from machine home to the work piece. Typically, in the determination of the distance from machine home position to the work piece, the operator views the travel indicated on the computers's Cathode Ray Tube (CRT) and adds five inches to it. That numerical value is then inserted or inputted into the computer's work piece offset memory for use in the machining program.

Therefore, with the tool length known, and the distance that the machine head must travel to reach the work piece known, the computer has sufficient information to execute a machining program. For example, to perform a single drilling operation in a work piece, the following information is required: 1) the distance from the Z origin of the work piece to machine home; 2) the distance from machine home to the work piece; 3) the distance from machine home to the Z origin with the tool inserted into the machine head; and, 4) a drilling instruction programmed into the computer, instructing the machine to drill a certain distance.

As shown in FIG. 1, the axis reference probe has a body 11, the body has a first end portion 12, a second end portion 13, and an intermediate portion 14. The first end portion of the body 12 is in the shape of a frustum of a cone. The second end portion of the body 13 is generally cylindrically shaped as is the intermediate portion of the body 14. The body 11 has a first bore 15 and a second bore 16 contained therein. Additionally, the body 11 has weight reducing bores 39 located primarily in the second end portion of the body 13. The preferred embodiment uses several weight reducing bores 39. It should be readily understood that the weight reducing bores 39 could be located in other locations in the axis reference probe. In the preferred embodiment, the axis reference probe is made of aluminum. Aluminum is used as the body material in the axis reference probe since its lightweight permits the axis reference probe to be mounted inversely (upside down).

In particular, the aluminum material facilitates use of the axis reference probe in the work piece setting mode. The function of the weight reducing bores 39 is to, as the name implies, reduce the weight of the axis reference probe. A light overall weight of the axis reference probe is desirable. When used in the work piece setting mode, it is typically mounted and attached to the machine head through use of magnetic means 26. The magnetic means 26 is an integral part of a plug 23. A further description of the mounting of the axis reference probe will follow.

The first bore 15 extends longitudinally through said first, second, and intermediate portions of said body. The first bore has a first diameter 40 in the first end portion 12, and a second diameter 41 in the second end portion 13. The second diameter 41 of the first bore is larger than the first diameter 40 of the first bore.

Figure 4:
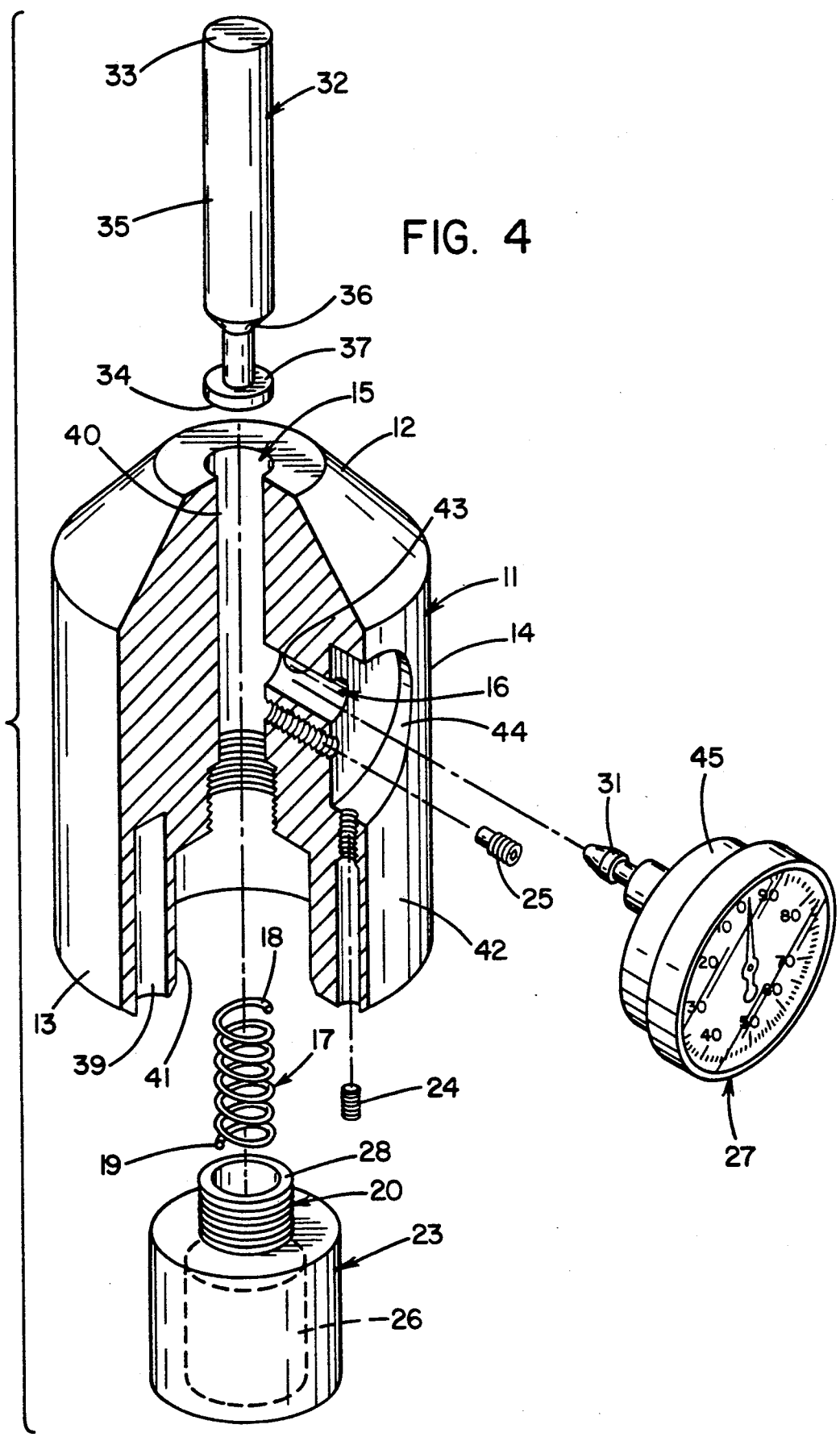
FIG. 4 is an exploded perspective view of the axis reference probe which is partially cut away.

As can be seen from FIG. 4, the second bore 16 resides generally in the intermediate portion of the body 14. The second bore 16 extends generally transversely to the first bore 15 and communicates between the exterior 42 of the body 11 and the first bore 15. The second bore 16 has a first diameter 43 near the first bore and intersecting the first bore. The second bore has a second diameter 44 near the exterior 42 of the body 11. A second diameter 44 of the second bore 16 is larger than the first diameter 43. The second diameter 44 of the second bore 16 is larger than the first diameter of said second bore and receives a housing 45 of a gage 27. The first diameter 43 of the second bore 16 receives a cam following actuation arm 31 of the gage 27.

A plunger 32 resides primarily in the first bore 15 in the body 11. The plunger has a first end portion 33, a second end portion 34 and an intermediate portion 35, all of which can be seen from FIG. 4. The first end portion of the plunger 33 is generally cylindrically shaped. The second end portion 34 is also generally cylindrically shaped and the second end portion 34 has a shoulder 37 located thereon. The intermediate portion of the plunger 35 has a cam 36 located thereon. The cam 36 tapers from a larger diameter to a smaller diameter in the direction of the second end portion 34 of the plunger 32. The cam 36 on the intermediate portion 35 of the plunger engages, as hereinafter will be described, the cam following actuation arm 31 of the gage 27 when the first end portion 33 of the plunger 32 engages a tool, a work piece, a machine head, or some other surface. The specific interaction between the cam following actuation arm 31 and the cam located on the plunger 32 will be described with specificity hereinafter, once the additional elements of the invention have been set forth.

A spring retainer 20 is integral to a plug 23. In the preferred embodiment, the spring retainer 20 and the plug 23 are one piece. The spring retainer 20 has a first end portion 28 and a second end portion 29. Additionally, in the preferred embodiment, the spring retainer 20 has exterior threads affixing it to the first bore. Additionally, in the preferred embodiment, the first bore 15 in the body 11 is adapted to engage the threads on the spring retainer. It should be understood that the spring retainer 20 and the plug 23 could be manufactured separately as two distinct elements and their function in this invention would not change.

A spring 17 has a first end portion 18 and a second end portion 19 and resides between the spring retainer 20 and the shoulder 37 on the second end portion 34 of the plunger 32. The first end portion 28 of the spring retainer 20 is open to receive the second end portion 19 of the spring 17. The second end portion 29 of the spring retainer 20 is closed. The second end portion 19 of the spring 20 resides in contact with the second end portion 29 of the spring retainer 20. Particularly, the first end portion of the spring engages the shoulder 37 on the second end portion 34 of the plunger 32. The second end portion 19 of the spring 17 engages the spring retainer 20. The spring 17 tends to urge the plunger 32 toward the first end portion of the body 12.

A first threaded set screw 24 engages the exterior 45 of the gage 27. A second threaded set screw 25 engages the shoulder 37 on the second end portion 34 of the plunger 32. A good view of the second set screw 25 engaging the shoulder 37 on the plunger 32 can be viewed in FIG. 5.

Figure 5:
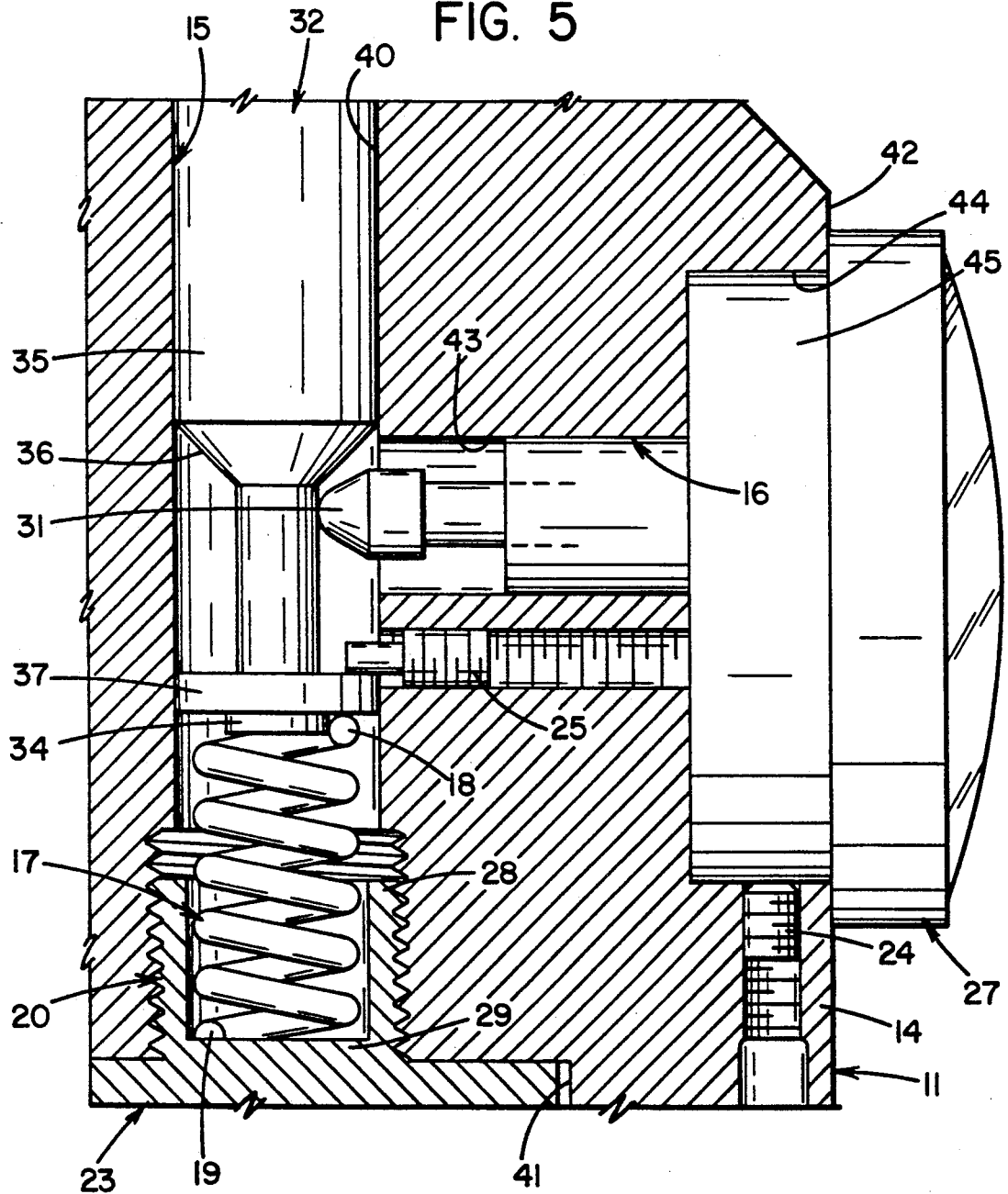
FIG. 5 is an enlarged side elevational, sectional view of the axis reference probe indicating a portion of the axis reference probe.

The second set screw 25 has as its main purpose or function is the retention of the plunger 32. The spring has sufficient force, but for the second set screw 25 to push the plunger in the direction of the first end portion 12 of the body such that there is a possibility the plunger could escape from the body. In the preferred embodiment it has been found that, even absent the second set screw 25, the plunger would not escape from the body due to the fact that the cam following actuation arm 31 sufficiently blocks the plunger from escaping. The cam following actuation arm 31 acts as a retention means in that regard. FIG. 5 is an enlarged cross sectional view of the axis reference probe in the region where the cam following actuation arm 31 meets with the cam 36 on the intermediate portion 35 of the plunger 32. FIG. 5 and the information contained therein are important in understanding the present invention. FIG. 5 is an enlarged cross sectional view and shows the plunger 32 in its first position. In the first position, the plunger is forced toward the first end portion 12 of the body 11. This is the position assumed by the plunger when its first end portion does not engage, for example, the machine head.

When the plunger is in the first position (FIGS. 1 and 5), it can be seen that the cam following actuation arm 31 does not engage the sloped cam surface 36 located on the plunger 32. Rather, the cam following actuation arm 31 resides on a portion of the plunger of smaller diameter. This smaller diameter portion of the plunger produces no transverse movement of the cam following actuation arm 31 when the plunger initially engages a tool, machine head, or other surface.

The movement of the plunger toward the second end portion 13 of the body 11 occurs when the first end portion of the plunger engages, for instance, a machine tool, a machine head, a reference surface, a table or some such other device. Once the engagement of the plunger takes place, the movement of the plunger in the direction of the second end portion 13 of the body 11 proceeds. As the plunger proceeds towards the second end portion 13 of the body to an extent where the cam following actuation arm 31 first begins to ride upon the cam surface 36 located on the plunger 32, the indication of the gage will change. Specifically, the indicator on the gage, which is a rotary indicator, will change once the cam following actuation arm 31 begins to reside upon the cam surface 36 of the plunger 12.

Once this mating process begins, it will continue until such time as the cam following actuation arm 31 moves sufficiently to cause a zero indication on the face of the gage. When a zero indication exists on the face of the gage, the plunger is in the second position. When the plunger is in the second position, there will exist a five inch distance between the extremities of the first end portion of the plunger 33 and the second end portion 23 of the plug 26. Of course, as previously stated, the axis reference probe must first be calibrated so as to indicate zero when said five inch distance between said extremities exists.

The gage 27 employed in the preferred embodiment is readily available from GEM Corporation of Ohio. The gage 27 employed in the preferred embodiment translates transverse movement of the cam following actuation arm into rotary movement of the indicator with respect to the dial. This type of gage is well known to those skilled in the art and is available from several other manufacturers in addition to GEM Corporation. The gage 27 has an exterior 45 which has a slightly smaller diameter than the second diameter 44 of the second bore 16. The gage 27 fits snugly into the body 11 and is secured in place by set screw 24. The gage has an interior (not shown) which contains the mechanism which translates transverse movement of the cam following actuation arm 31 into rotary movement of the indicator on the gage.

Figure 3A:
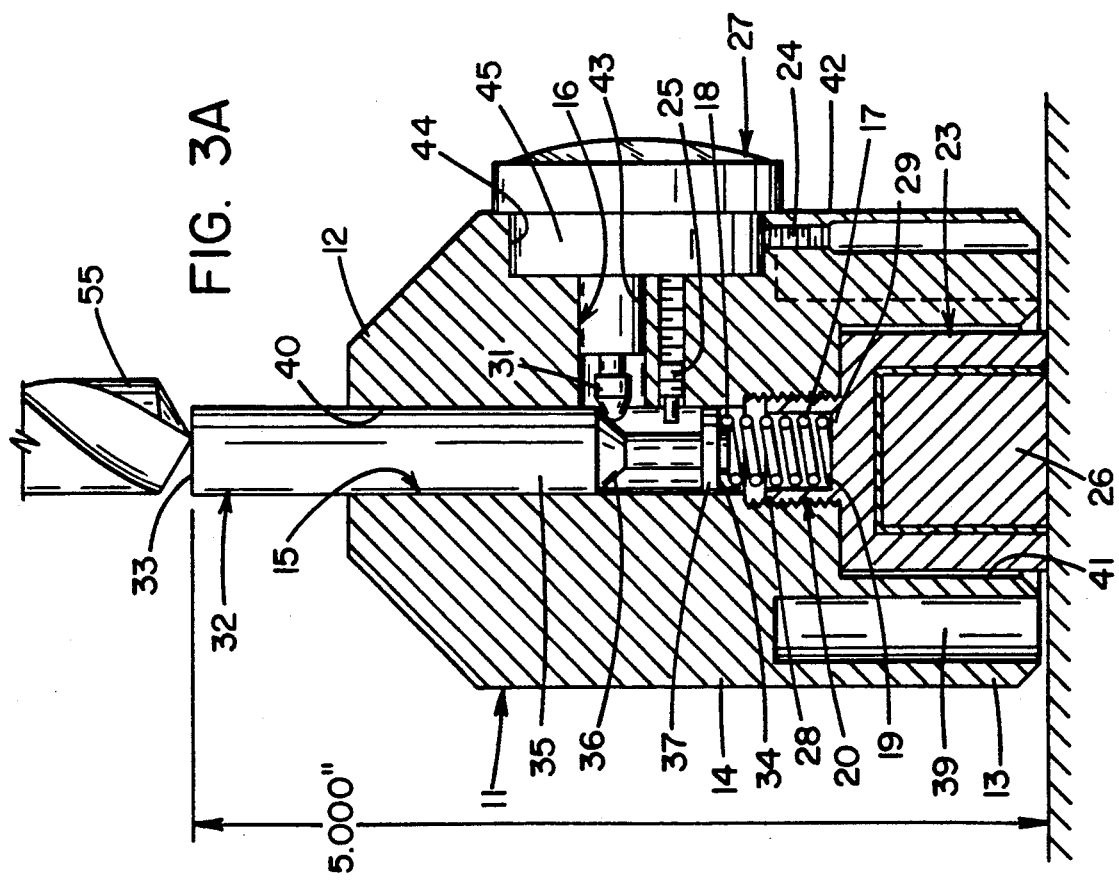
FIG. 3A is a side elevational view of the exterior of the axis reference probe during engagement of said axis reference probe with a machine tool.

The second position of the plunger 32 is shown in FIG. 3A. The "zero" indication of the gage is shown in FIG. 3. FIGS. 3 and 3A indicate engagement with a tool 55 causing the distance from the first end portion of the plunger 33 to the second end portion 23 of the plug 26 to be exactly five inches. When the axis reference probe is mounted inversely and engages a work piece, the work piece engages the first end portion 33 of the plunger. FIGS. 1, 2, and 5 show the axis reference probe disengaged with the plunger in its first position.

The five inch distance employed in the preferred embodiment between the two extremes of the axis reference probe, namely the first end portion of the plunger and the plug, is an arbitrary selection. Another embodiment could use another distance between its extremities such as four inches or six inches without deviating from the intent or the concept of the present invention.

While this invention has been described in detail with particular reference to the preferred embodiment thereof, it will be understood that other changes and modifications can be effected within the spirit and scope of the invention without deviating from the invention as hereinafter claimed.

What is claimed:

1. An axis reference probe comprising a body, said body having first and second end portions and an intermediate portion therebetween, said first end portion of said body being generally in the shape of a frustum of a cone, said intermediate portion and said second end portion of said body being generally cylindrically shaped, said body having first and second bores and weight reducing bores, said body having an exterior, said first bore extending longitudinally through said first and second end portions and said intermediate portion of said body, said first bore having a first diameter in said first end portion of said body, said first bore having a second diameter in said second end portion of said body, said second diameter of said first bore being larger than said first diameter of said first bore, said second bore residing generally in said intermediate portion of said body, said second bore extending generally transversely to said first bore and communicating between said exterior of said body and said first bore, said second bore having a first diameter near said first bore and intersecting said first bore, said second bore having a second diameter near said exterior of said body, said second diameter of said second bore being larger than said first diameter of said second bore, said weight reducing bores residing generally in said second end portion of said body, a spring having first and second end portions, a spring retainer having first and second end portions, said first end portion of said spring retainer being open to receive said second end portion of said spring, said second end portion of said spring retainer being cylindrically shaped and closed, said spring retainer residing in said first bore, a plug, said plug having first and second end portions, said second end portion of said spring retainer being attached to said first end portion of said plug, said second end portion of said plug having magnetic means enabling attachment of said axis reference probe to a reference surface oriented in any direction in any axis, said plug residing in said second diameter of said first bore, a gage, said gage having an exterior portion, said gage residing in said second diameter of said second bore, said gage having a cam following actuation arm, a plunger, said plunger having first and second positions, said plunger having first and second end portions and an intermediate portion, said first end portion of said plunger being generally cylindrically shaped, said intermediate portion of said plunger having a cam located thereon, said cam of said intermediate portion of said plunger engaging said cam following actuation arm of said gage during set up of a machine tool operation, said second end portion of said plunger being generally cylindrically shaped and having a shoulder thereon, said first end portion of said spring engaging said shoulder of said second end portion of said plunger, said second end portion of said spring engaging said second end portion of said spring retainer, a first threaded set screw and a second threaded set screw, said first set screw carried by said body and engaging said exterior of said gage to secure said gage in place, said plunger movable between said first and second positions, said spring acting against said second end portion of said plunger and urging said plunger toward said first position, said second set screw carried by said body and located in the path of the movement of said shoulder on said plunger and preventing plunger withdrawal from said first bore in said body, said gage having an indicator, said cam following actuation arm engaging said cam on said intermediate portion of said plunger upon movement of said plunger in the direction of said second end portion of said body, said plunger moving to said second position against the bias of said spring during set up of a machine tool operation, said cam following actuation arm moving transversely toward said exterior of said body and translating longitudinal movement of said plunger in the direction of said second end of said body into rotary movement of said indicator, said gage having means enabling said indicator to indicate zero when the distance from said first end of said plunger is a predetermined distance form said second end of said plug.

2. An axis reference probe including in combination a body, a first bore extending longitudinally into said body, a plunger having first and second end portions residing in said first bore and movable between first and second positions therein, a plug residing in said first bore, a spring retainer attached to said plug and residing in said first bore, a spring carried by said spring retainer, said spring acting against said second end portion of said plunger and urging said plunger toward said first position, a cam surface on said plunger, a second bore extending generally transversely to the extend of said first bore and communicating between the exterior of said body and said first bore, a gage residing in said second bore at the exterior of said body, said gage having a rotary indicator, said gage having a cam following actuation arm engageable with said cam surface on said plunger for translating longitudinal movement of said plunger to said second position into rotary movement of said indicator.

3. An axis reference probe comprising a body, said body having first and second end portions, a first bore extending longitudinally through said first and second end portions, a plunger residing in said first bore and having a cam thereon, a second bore extending from the exterior of said body to said first bore, a gage having a cam following actuation arm in said second bore and engageable with said cam on said plunger, said gage translating longitudinal movement of said plunger toward said second end of said body into rotary indication on said gage, a spring retainer, a plug, said spring retainer affixed to said plug, said spring retainer residing in said first bore, a spring extending between said spring retainer and said plunger and urging said plunger toward said first end of said body and resisting movement of said plunger toward said second end of said body, means for securing said gage to said body, and wall means on said body and plunger for preventing said plunger from escaping said bore.

4. An axis reference probe as claimed in claim 3 wherein said plug includes a magnetic means enabling said axis reference probe to be secured to a magnetic member.

5. An axis reference probe as claimed in claim 3 wherein said plunger includes first and second end portions, said first end portion being engageable with a tool, spindle, or reference surface to urge said plunger toward said second end of said body, and said second end portion of said plunger engageable with a spring to urge said plunger toward said first end of said body.

6. An axis reference probe as claimed in claim 3 wherein said body includes weight reduction bores to facilitate orientation of said axis reference probe in any axis.

7. An axis reference probe as claimed in claim 3 wherein said body of said axis reference probe is non-ferrous.

8. An axis reference probe comprising a non-ferrous body, said non-ferrous body having first and second end portions, a plunger residing in a first opening in said non-ferrous body and moveable therein, said plunger having a cam thereon, said plunger having first and second end portions, said first end portion of said plunger located generally exteriorly of said first end portion of said non-ferrous body, a spring retainer in said first opening in said non-ferrous body, a spring extending between said spring retainer and said second end portion of said plunger, a plug, said plug having first and second end portions, said spring retainer affixed to said first end portion of said plug, a gage, said gage affixed to said non-ferrous body, said gage having an indicator, said gage having a cam following actuation arm residing in a second opening in said non-ferrous body, said cam following actuation arm engageable with said cam on said plunger, said cam following actuation arm translating movement of said plunger toward said second end of said non-ferrous body into rotary movement of said indicator of said gage, said indicator indicating zero when the distance between said first end portion of said plunger and said second end portion of said plug is a given predetermined distance.

* * * * *